US010304440B1

(12) United States Patent
Panchapagesan et al.

(10) Patent No.: US 10,304,440 B1
(45) Date of Patent: May 28, 2019

(54) KEYWORD SPOTTING USING MULTI-TASK CONFIGURATION

(71) Applicant: Amazon Technologies, Inc., Seattle, WA (US)

(72) Inventors: Sankaran Panchapagesan, Mountain View, CA (US); Bjorn Hoffmeister, Seattle, WA (US); Arindam Mandal, Redwood City, CA (US); Aparna Khare, San Jose, CA (US); Shiv Naga Prasad Vitaladevuni, Cambridge, MA (US); Spyridon Matsoukas, Hopkinton, MA (US); Ming Sun, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/198,578

(22) Filed: Jun. 30, 2016

Related U.S. Application Data

(60) Provisional application No. 62/191,268, filed on Jul. 10, 2015.

(51) Int. Cl.
| | |
|---|---|
| *G10L 15/06* | (2013.01) |
| *G10L 15/08* | (2006.01) |
| *G10L 15/14* | (2006.01) |
| *G10L 15/16* | (2006.01) |
| *G10L 15/28* | (2013.01) |

(52) U.S. Cl.
CPC ............ *G10L 15/08* (2013.01); *G10L 15/063* (2013.01); *G10L 15/142* (2013.01); *G10L 15/16* (2013.01); *G10L 15/285* (2013.01); *G10L 2015/088* (2013.01)

(58) Field of Classification Search
None
See application file for complete search history.

(56) References Cited

U.S. PATENT DOCUMENTS

| | | | | | |
|---|---|---|---|---|---|
| 5,280,563 | A | * | 1/1994 | Ganong | .................. G10L 15/18 704/200 |
| 5,404,422 | A | * | 4/1995 | Sakamoto | ............... G10L 15/16 704/232 |
| 5,625,748 | A | * | 4/1997 | McDonough | ....... G10L 15/1822 704/236 |

(Continued)

OTHER PUBLICATIONS

Rose, Richard C., and Douglas B. Paul. "A hidden Markov model based keyword recognition system." In Acoustics, Speech, and Signal Processing, 1990. ICASSP-90., 1990 International Conference on, pp. 129-132. IEEE, 1990.

(Continued)

*Primary Examiner* — Fariba Sirjani
(74) *Attorney, Agent, or Firm* — Occhiuti & Rohlicek LLP

(57) ABSTRACT

An approach to keyword spotting makes use of acoustic parameters that are trained on a keyword spotting task as well as on a second speech recognition task, for example, a large vocabulary continuous speech recognition task. The parameters may be optimized according to a weighted measure that weighs the keyword spotting task more highly than the other task, and that weighs utterances of a keyword more highly than utterances of other speech. In some applications, a keyword spotter configured with the acoustic parameters is used for trigger or wake word detection.

24 Claims, 6 Drawing Sheets

(56) References Cited

U.S. PATENT DOCUMENTS

| | | | | |
|---|---|---|---|---|
| 5,687,286 | A | * | 11/1997 | Bar-Yam ................. G06K 9/62 704/202 |
| 5,710,864 | A | * | 1/1998 | Juang .................... G10L 15/142 704/231 |
| 5,727,124 | A | * | 3/1998 | Lee ....................... G10L 15/065 704/233 |
| 5,860,063 | A | * | 1/1999 | Gorin ................. G10L 15/1815 704/245 |
| 6,070,140 | A | * | 5/2000 | Tran ...................... G06F 1/3203 704/232 |
| 6,185,528 | B1 | * | 2/2001 | Fissore ................... G10L 15/26 704/232 |
| 6,434,520 | B1 | * | 8/2002 | Kanevsky ......... G06F 17/30746 704/243 |
| 8,069,042 | B2 | * | 11/2011 | Joublin ................. G10L 15/063 704/243 |
| 9,443,517 | B1 | * | 9/2016 | Foerster ................. G10L 15/08 |
| 9,613,619 | B2 | * | 4/2017 | Lev-Tov ................. G10L 15/01 |
| 9,646,634 | B2 | * | 5/2017 | Sainath ................... G10L 25/30 |
| 2004/0199388 | A1 | * | 10/2004 | Armbruster ............ G10L 15/22 704/251 |
| 2005/0086226 | A1 | * | 4/2005 | Krachman ............ G06Q 50/26 |
| 2006/0111897 | A1 | * | 5/2006 | Gemello ................. G10L 15/16 704/202 |
| 2007/0288242 | A1 | * | 12/2007 | Spengler ................ G10L 15/20 704/275 |
| 2009/0216528 | A1 | * | 8/2009 | Gemello ............... G10L 15/065 704/232 |
| 2009/0292541 | A1 | * | 11/2009 | Daya ..................... G10L 15/063 704/251 |
| 2010/0145678 | A1 | * | 6/2010 | Csomai ............... G06F 17/2755 704/9 |
| 2014/0071095 | A1 | * | 3/2014 | Godsill ................ G06F 3/0418 345/177 |
| 2014/0278390 | A1 | * | 9/2014 | Kingsbury .......... G10L 15/1822 704/232 |
| 2015/0127594 | A1 | * | 5/2015 | Parada San Martin ...................... G06N 3/0454 706/16 |
| 2015/0228277 | A1 | * | 8/2015 | Anhari .................... G10L 25/51 704/232 |
| 2015/0302847 | A1 | * | 10/2015 | Yun ........................ G10L 15/02 704/251 |
| 2015/0340032 | A1 | * | 11/2015 | Gruenstein ............. G10L 15/16 704/232 |
| 2015/0364129 | A1 | * | 12/2015 | Gonzalez-Dominguez .................. G10L 15/005 704/251 |
| 2016/0019884 | A1 | * | 1/2016 | Xiao ..................... G10L 15/063 704/232 |
| 2016/0092766 | A1 | * | 3/2016 | Sainath ................... G10L 25/30 706/20 |
| 2016/0180214 | A1 | * | 6/2016 | Kanevsky ............ G06N 3/0454 706/21 |
| 2016/0180838 | A1 | * | 6/2016 | Parada San Martin ...................... G06F 1/3203 704/232 |
| 2016/0217367 | A1 | * | 7/2016 | Moreno ................. G10L 15/16 |
| 2016/0240190 | A1 | * | 8/2016 | Lee ....................... G10L 15/142 |
| 2016/0260428 | A1 | * | 9/2016 | Matsuda ................. G06N 3/08 |
| 2016/0283841 | A1 | * | 9/2016 | Sainath ................... G10L 15/16 |
| 2016/0350655 | A1 | * | 12/2016 | Weiss .................... G06N 3/088 |
| 2017/0186430 | A1 | * | 6/2017 | Sharifi ................... G10L 15/08 |
| 2017/0206889 | A1 | * | 7/2017 | Lev-Tov ................. G10L 15/01 |

OTHER PUBLICATIONS

Wilpon, Jay G., Lawrence R. Rabiner, C-H. Lee, and E. R. Goldman. "Automatic recognition of keywords in unconstrained speech using hidden Markov models." IEEE Transactions on Acoustics, Speech, and Signal Processing 38, No. 11 (1990): 1870-1878.

Wilpon, J. G., L. G. Miller, and P. Modi. "Improvements and applications for key word recognition using hidden Markov modeling techniques." In Acoustics, Speech, and Signal Processing, 1991. ICASSP-91., 1991 International Conference on, pp. 309-312. IEEE, 1991.

Seltzer, Michael L., and Jasha Droppo. "Multi-task learning in deep neural networks for improved phoneme recognition." In Acoustics, Speech and Signal Processing (ICASSP), 2013 IEEE International Conference on, pp. 6965-6969. IEEE, 2013.

Bell, Peter, and Steve Renals. "Regularization of context-dependent deep neural networks with context-independent multi-task training." In Acoustics, Speech and Signal Processing (ICASSP), 2015 IEEE International Conference on, pp. 4290-4294. IEEE, 2015.

Bell, Peter, Joris Driesen, and Steve Renals. "Cross-lingual adaptation with multi-task adaptive networks." In Fifteenth Annual Conference of the International Speech Communication Association. 2014. 5 pages.

Strom, Nikko. "Scalable distributed DNN training using commodity GPU cloud computing." In Sixteenth Annual Conference of the International Speech Communication Association. 2015. 9 pages.

Chen, Guoguo, Carolina Parada, and Georg Heigold. "Small-footprint keyword spotting using deep neural networks." In Acoustics, Speech and Signal Processing (ICASSP), 2014 IEEE International Conference on, pp. 4087-4091. IEEE, 2014.

* cited by examiner

KEYWORD SPOTTING USING MULTI-TASK CONFIGURATION

CROSS-REFERENCE TO RELATED APPLICATIONS

This application claims the benefit of U.S. Provisional Application No. 62/191,268 filed Jul. 10, 2015, which is incorporated herein by reference.

BACKGROUND

This invention relates to keyword spotting in audio signals, and more particularly to multi-task configuration of a system for keyword spotting.

Automated speech recognition (ASR) involves acquisition of data representing an acoustic input, which generally includes human-produced speech. An ASR system processes that data in order ultimately to act according that speech. For example, the user may say "Play music by the Beatles" and the processing of the acquired data representing the acoustic input that includes that utterance causes Beatles music to be played to the user.

Different applications of ASR generally make use of somewhat different types of processing. One type of data processing of the data aims to transcribe the words spoken in an utterance prior to acting on a command represented by the transcribed words. In some such applications, the user indicated that he wishes to speak by pressing a button. Data acquisition may be initiated by the button press and terminated when speech is no longer found in the data. Such processing is sometimes referred to as a "push-to-talk" approach.

Some applications of ASR do not require the user to press a button. In one approach, the user can signal that he wishes to speak a command by first speaking a "trigger" word, also referred to as a "wake" word. In some systems, the user may immediately follow the trigger word with the command, for example, as "Alexa, play music by the Beatles" where "Alexa" is the trigger word. Processing the data to detect the presence of the trigger word is often referred to as word spotting (or keyword spotting). An ASR system that monitors an acoustic signal waiting for the user to speak an appropriately structured utterance (such as an utterance beginning with a trigger word) may be referred to as implementing an "open microphone" approach.

DETAILED DESCRIPTION

Figure 1:
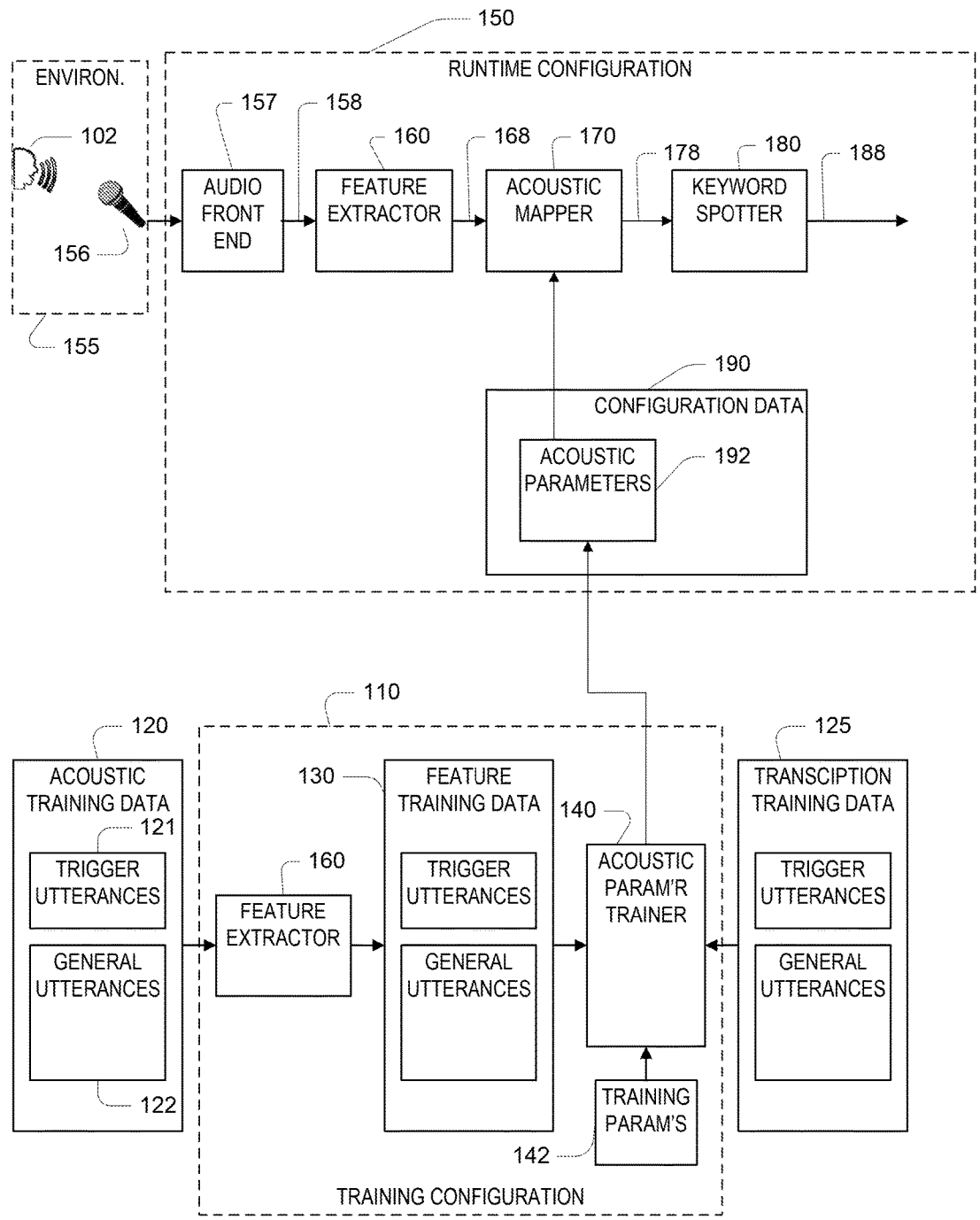
FIG. 1 is a block diagram of a runtime configuration of an automated speech recognition (ASR) system.

The description below includes an automatic speech recognition (ASR) system that operates in an "open microphone" runtime mode. Generally, the runtime system includes a keyword spotter that performs a keyword spotting task to detect occurrences of a trigger word. It should be appreciated that it can be quite important that the system accurately detects the user speaking the trigger word, or else the system may ignore instances when the user is trying to issue a command, or the system may act when it incorrectly makes a "false alarm" even though the user may not have spoken or may have spoken an utterance not directed to the system. One important factor that affects the performance on the trigger word detection task is the manner in which the runtime system is configured, and more specifically, the manner in which numerical parameters that are used to configure the system are estimated (often referred to as "training"). One aspect of the system described below is a way to estimate the parameters used to configure the system by using a multi-task training approach in a training stage. Before providing details regarding this training aspect, the system in which these parameters are used is first described.

In general, a microphone senses an acoustic input in an acoustic environment of the ASR system. The output of the microphone is digitized and then processed by the ASR system to produce the data representing the acoustic input. A variety of types of processing of the digitized signal may be used for automated speech recognition. A common approach to such processing involves representing the short-time energy spectrum (e.g., the pattern or acoustic energy in different frequency bands) as a fixed-length numerical vector, generally referred to as a "feature vector," at discrete time points or intervals (e.g., every 10 milliseconds).

At runtime, an ASR system generally makes use of various types of data, including: instructions and/or data characterizing circuitry for performing a speech recognition procedure; data representing the linguistic aspects of the speech recognition task (e.g., the word, subword and/or phonetic structure, and semantic structure); and data associating characteristics of the acoustic input and subword and/or phonetic elements used to represent the linguistic aspects of the speech recognition task. Below we generally refer to the data representing the linguistic aspects as "linguistic parameters" and/or "linguistic structure" of the system, and refer to the last of these as "acoustic parameters" of the system, without intending to connote any particular characteristics of the data by these terms.

Various structures of acoustic parameters and procedures for determining values of the acoustic parameters of an ASR system can be used. Most approaches make use of acoustic data that is processed prior to a use of the system in what may be referred to as an acoustic "training" or "parameter estimation" stage, with that acoustic data being referred to as "training data." In some systems, the acoustic parameters may be updated during use, for example, to better match the characteristics of a user or users of the system. Such updating is often referred to as parameter "adaptation." A number of approaches to acoustic training and adaptation have been used over the past 40 or more years.

One class of approaches generally makes use of parametric probabilistic models that characterize distributions of the feature vectors for different subword or phonetic units or parts of those units that are represented in the linguistic structure of the system. For instance, multivariate Gaussian distributions may be used in this class of approaches. Another approach makes use of parametric structures that take as input a feature vector and produce as output a distribution corresponding to that input feature vector. The distribution represents the relative likelihood (e.g., a probability distribution) of the subword or phonetic units in the linguistic structure. One class of this latter approach uses Artificial Neural Networks (ANNs), which provide a computational framework for parameter estimation as well as for use with new acoustic data. Recently, a particular class of ANNs, broadly referred to as "deep" neural networks (DNNs), has been found to be useful in transcription applications of automated speech recognition. The training of acoustic parameters and the general approach and specific structure of the parameters can have a dramatic effect on the performance of an ASR system.

One approach to keyword spotting makes use of a Hidden Markov Model (HMM) in which the keyword is represented as a set of states, generally arranged as a chain, with each state corresponding to a different sound. Other states generally represent non-keyword speech or non-speech sounds. The use of HMM to process the input distributions to yield the state distribution uses procedures, for example, as described in Rose, Richard C., and Douglas B. Paul. "A hidden Markov model based keyword recognition system," in *International Conference on Acoustics, Speech, and Signal Processing*, pp. 129-132. IEEE, 1990; Wilpon, Jay G., L. Rabiner, Chin-Hui Lee, and E. R. Goldman. "Automatic recognition of keywords in unconstrained speech using hidden Markov models." *IEEE Transactions on Acoustics, Speech and Signal Processing*, 38, no. 11 (1990): 1870-1878; and Wilpon, J. G., L. G. Miller, and P. Modi. "Improvements and applications for key word recognition using hidden Markov modeling techniques." In *International Conference on Acoustics, Speech, and Signal Processing*, pp. 309-312. IEEE, 1991.

Referring to FIG. 1, an example of a runtime configuration 150 of an automated speech recognition system implements an "open microphone" approach for a runtime stage of operation in which an acoustic environment 155, such as a home living room, is monitored and particular user utterances spoken by a user 102 in the acoustic environment are processed by the system. In this embodiment, the system aims to process utterances that are prefixed by a trigger word (e.g., "Alexa") and followed by a well-structured command or query (e.g., "play music by the Beatles"), and in general, to ignore utterances that are not so prefixed. In FIG. 1, only certain parts of the runtime configuration, which are related to detection of the trigger word, are illustrated. It should be understood that a trigger "word" may be a multi-word phrase (e.g., "Alexa please").

During the runtime stage, the system monitors the acoustic environment using a microphone 156 to produce a signal 158 (e.g., a digital signal) representing the acoustic input to the microphone. In general, an audio front end 157 is used to process the raw output of the microphone 156 (e.g., an analog electrical signal) to yield the signal 158. The audio front end may implement one or more of analog-to-digital conversion, sample rate conversion, beamforming, acoustic echo cancellation, noise mitigation, automatic gain control, and voice activity detection. A feature extractor 160 processes the signal 158 to yield digital output comprising a sequence of feature vectors 168, which may be fixed-length numerical vectors. For example, the feature vector is a vector of log-frequency-band energies (LFBE), however it should be understood that other types of feature extraction may yield other feature vectors, for example, with a different spectral representation or including non-spectral elements. In this example, the feature extractor 160 produces the feature vectors 168 continuously (e.g., at fixed repeated intervals once every 10 milliseconds). More generally, the feature extractor 160 provides a sequence of numerical and/or categorical representations that is determined from the signal representing acoustic input to the system. In some examples, the audio front end includes some form of a speech activity detector (not shown), for example based on a speech-like spectral profile exceeding a threshold energy, that limits production of feature vectors 168 to periods of time when speech is detected.

An acoustic mapper 170 performs a transformation of the feature vectors 168 produced by the feature extractor 160 to yield the distributions 178 used as input to a keyword spotter 180. The acoustic mapper 170 is configured according to acoustic parameters 192, which are part of the overall configuration data 190 of the runtime configuration. Performance of the keyword spotter depends strongly on the nature of the acoustic parameters. As the acoustic parameters 192 are part of the configuration data 190, they may also be referred to as "acoustic configuration parameters 192."

Generally, the keyword spotter produces an output 188 that indicates when the user 102 has spoken the trigger word. The output generally indicates the time of the detection of the trigger word, and optionally provides further information, for instance a certainty that the trigger word indeed occurred. As is described more fully below, the keyword spotter takes as input a sequence of distributions, generally with the same timing as produced by the feature extractor (e.g., every 10 milliseconds). Each distribution 178 is a numerical vector, where each element of the vector is associated with a different part of the trigger word or is associated with general speech or non-speech.

Continuing to refer to FIG. 1, the acoustic parameters 192 are determined in a training configuration 110 of the system. Acoustic training data 120 is collected prior to executing the training configuration during a training stage of operation. Generally this data results from processing a set of training utterances, and each utterance is processed using the same feature extractor 160 as used in the runtime configuration 150. This processing yields feature training data 130. Each utterance in the acoustic training data 120 yields one sequence of feature vectors in the feature training data 130. Transcription training data 125, which includes one transcription for each utterance in the acoustic training data, is also used by the training configuration. Generally, an acoustic parameter trainer 140 processes the feature training data 130 in combination with the transcription training data 125 to determine the acoustic parameters 192. More details of the operation of the parameter trainer 140 are provided below.

In the acoustic training approach implemented by the acoustic parameter trainer 140, two classes of training utterances are used in what may be referred to as a multi-task training approach. Generally, one class of utterances 121 is representative of a trigger word detection task, for example, having been recorded during a prior use of the runtime configuration or in a simulation of the runtime configuration, and optionally utterances that correspond to false detections of the trigger word. Another class of utterances 122 is associated with a general speech recognition task and is not necessarily related to the trigger word. For example, the other class of utterances is suitable for training of a Large Vocabulary Continuous Speech Recognition (LVCSR) task. This other class of utterances generally provides a sampling of general speech in the target language (or languages). These utterances may correspond to data recorded in an acoustic environment of the runtime configuration, or more typically may comprise recording of read sentences by a large number of different subjects.

As is described in more detail below, the manner in which the acoustic parameter trainer 140 makes use of the combination of the trigger utterances and the general utterances yields acoustic training parameters 192 that in turn yield improved performance of the keyword spotter 180. Very generally, the acoustic parameter trainer makes use of an approach that may be referred to as "multi-task learning," in which one task relates to distinguishing parts of the trigger word, and another task relates to distinguishing parts of general speech. Performance of a keyword spotter may be characterized by how well the system detects the trigger word (e.g., measured as a probability of detection) and how often the system declares that there is a detection of the keyword that is a "false alarm" or "false positive" (e.g., measured as a false alarm rate, such as a probability of a false alarm in a fixed time duration). Generally, it is desirable to achieve as high a possible detection probability and as low as possible a false alarm rate. Another characteristic of a word spotting procedure relates to the computation resources (e.g., processor cycles and/or memory size) required to monitor the acoustic data waiting for the trigger word to occur. Generally, it is desirable or necessary for the computation resources to not exceed a threshold available on the computing platform performing the processing. The acoustic parameter trainer 140 makes use of training parameters 142, which may be used to optimize and/or trade off different aspects of the performance of the keyword spotter 180.

Figure 2:
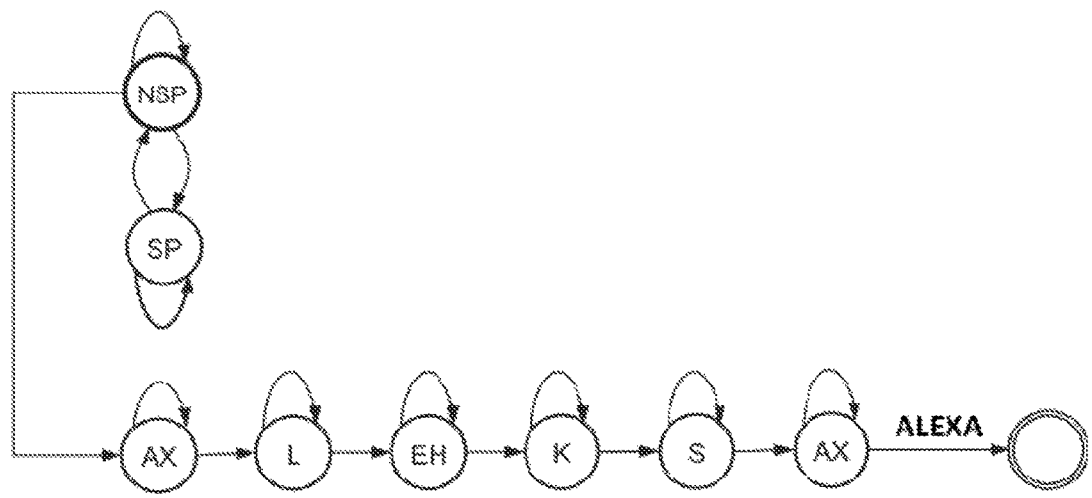
FIG. 2 is a state chain of a Hidden Markov Model of a keyword spotter.

Before continuing with a description of the acoustic parameter trainer 140, a short description of the keyword spotter 180 of this embodiment provides context. In this embodiment, the keyword spotter makes use of a Hidden Markov Model (HMM) approach. FIG. 2 shows a structure of the Markov Model used by the keyword spotter. In FIG. 2, some states are associated with parts of the trigger word. In this example, the states are labelled with phonetic labels of the parts of the trigger word "Alexa": AX, L, EH, K, S, AX. The other states are more general, with an NSP state corresponding to non-speech sounds, and an SP state corresponding to general speech sounds. The sequence of feature vectors 168 is modelled as corresponding to a sequence of states, with transitions being made at the rate that the feature vectors are generated. The procedure starts assuming that the input is in the non-speech state (NSP).

The input distributions 178 to the keyword spotter 180 have elements in which each element corresponds to a different one of the states. By virtue of the nature of speech, there is uncertainty in each input distribution 178 regarding the state with which the corresponding feature vector 168 is associated. The keyword spotter 180 processes the sequence of the distributions 178 to yield a distribution of a current state of the HMM based on a sequence of the input distributions 178.

Figure 3:
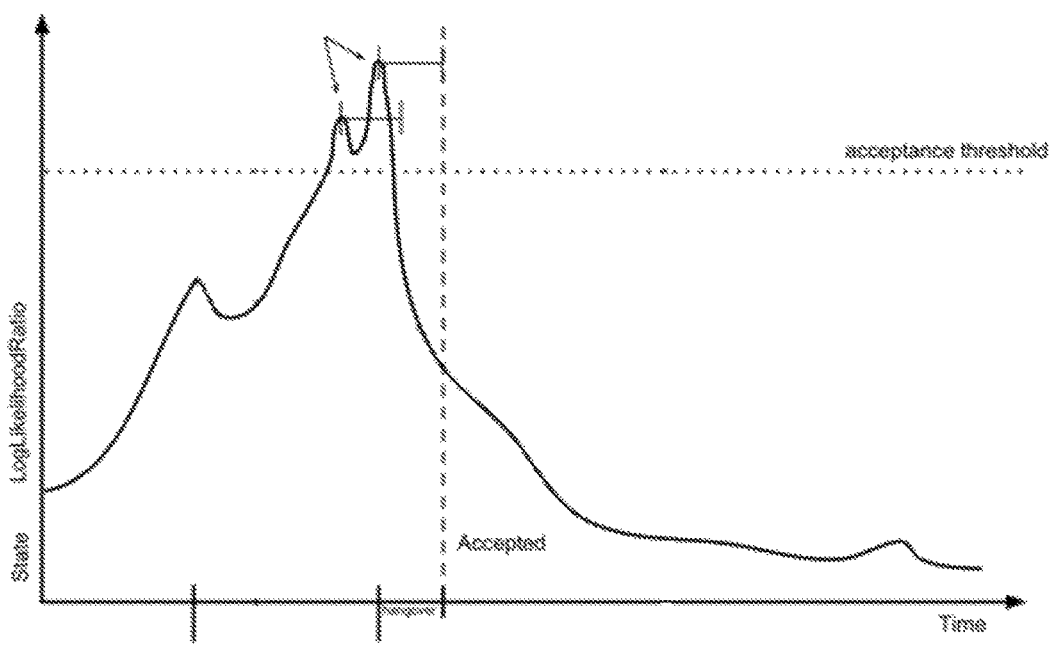
FIG. 3 is a graph of a keyword log-likelihood ratio as a function of time.

In this embodiment, the keyword spotter uses a log-likelihood-ratio (LLR) approach to determine when to declare that the trigger word has been detected. For example, the total probability, computed as a sum of the probabilities of the state being one of the trigger word states (AX, L, . . . , S, or AX), is divided by the probability of the state being one of the other states (SP or NSP). Referring to FIG. 3, the logarithm of that ratio is plotted. In this embodiment, the keyword spotter generally looks for a local maximum in the log likelihood ratio that is above a preset acceptance threshold. In order to avoid premature detection, when the spotter finds a local maximum, it waits for a "hangover" period to make sure that no higher local maximum is detected. In FIG. 3, the second local maximum is the highest, and after the hangover threshold associated with that maximum, the keyword spotter declares that the trigger word has been detected.

Figure 4:
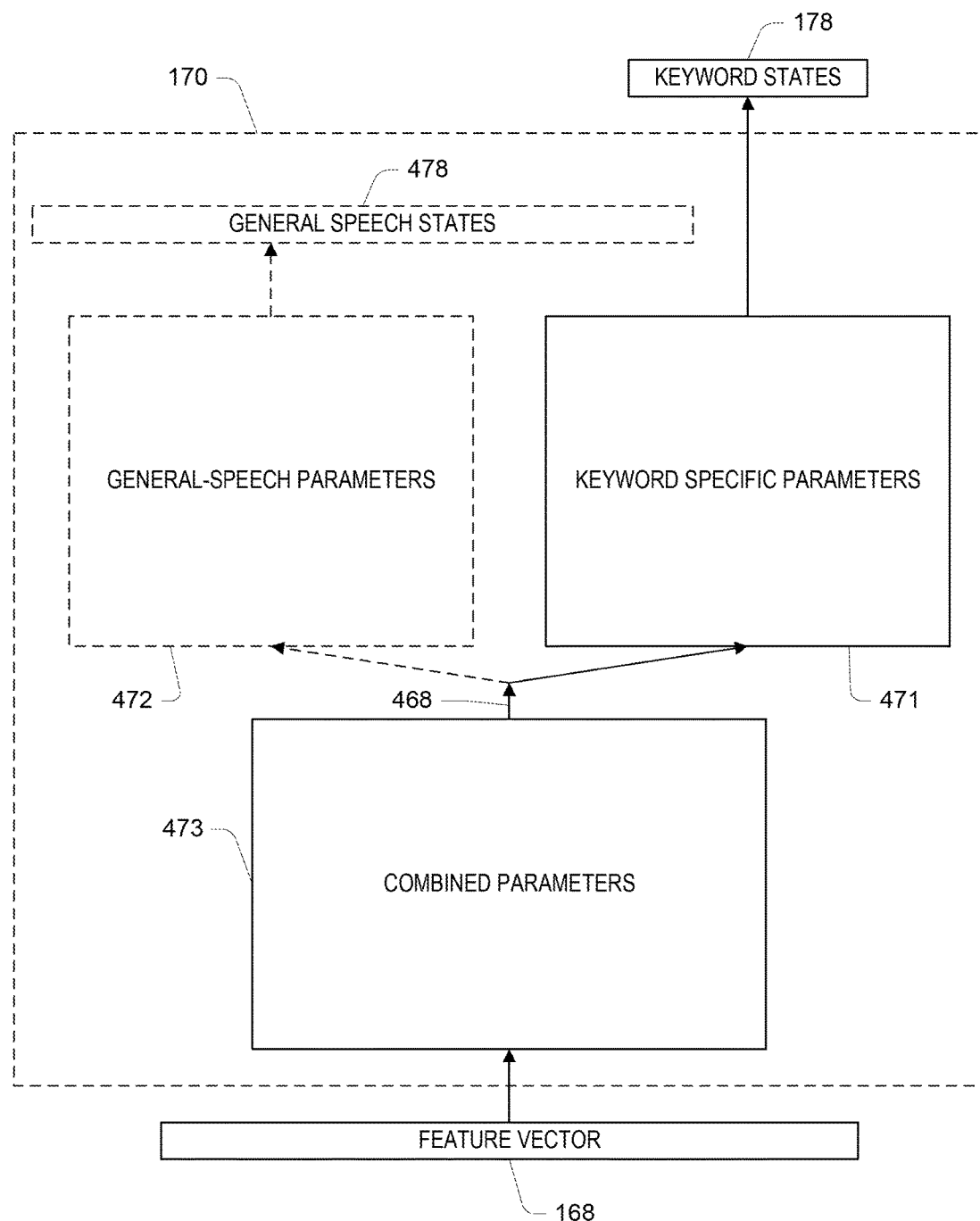
FIG. 4 is an illustration of organization of acoustic parameters.

Referring to FIG. 4, generally, the acoustic mapper 170 has a structure with several parts in which certain keyword-specific parameters 471 of one part are directly associated with keywords states, certain general-speech parameters 472 of another part are directly associated with states of general speech, and combined parameters 473 of yet another part are associated with both the keyword states and general speech.

During the training stage, the training configuration 110 makes use of training data for both trigger utterances 121 as well as for general utterances 122 to estimate or otherwise determine values of the parameters 471-473 of the acoustics parameters 192. During the runtime stage, the runtime configuration 150 does not make use of the general-speech parameters 472 for operation of the keyword spotter 180. However, because the general utterances 122 affect the combined parameters 473, and indirectly affect the keyword-specific parameters 471, the use of the general utterances 122 improves the performance of the keyword spotter 180.

Generally, in the runtime configuration, the acoustic mapper 170 accepts a feature vector 168, and using the combined parameters 473 produces an intermediate vector 468 as a transformation of that feature vector. The mapper produces the distribution 178 over keyword states using the keyword specific parameters as a transformation of the intermediate vector. The general-speech parameters 472 are not used at runtime by the keyword spotter 180. However, as discussed further below, in some alternative embodiments, these general speech parameters are used for other speech recognition tasks, for instance, for interpreting the command following the trigger word.

Figure 5:
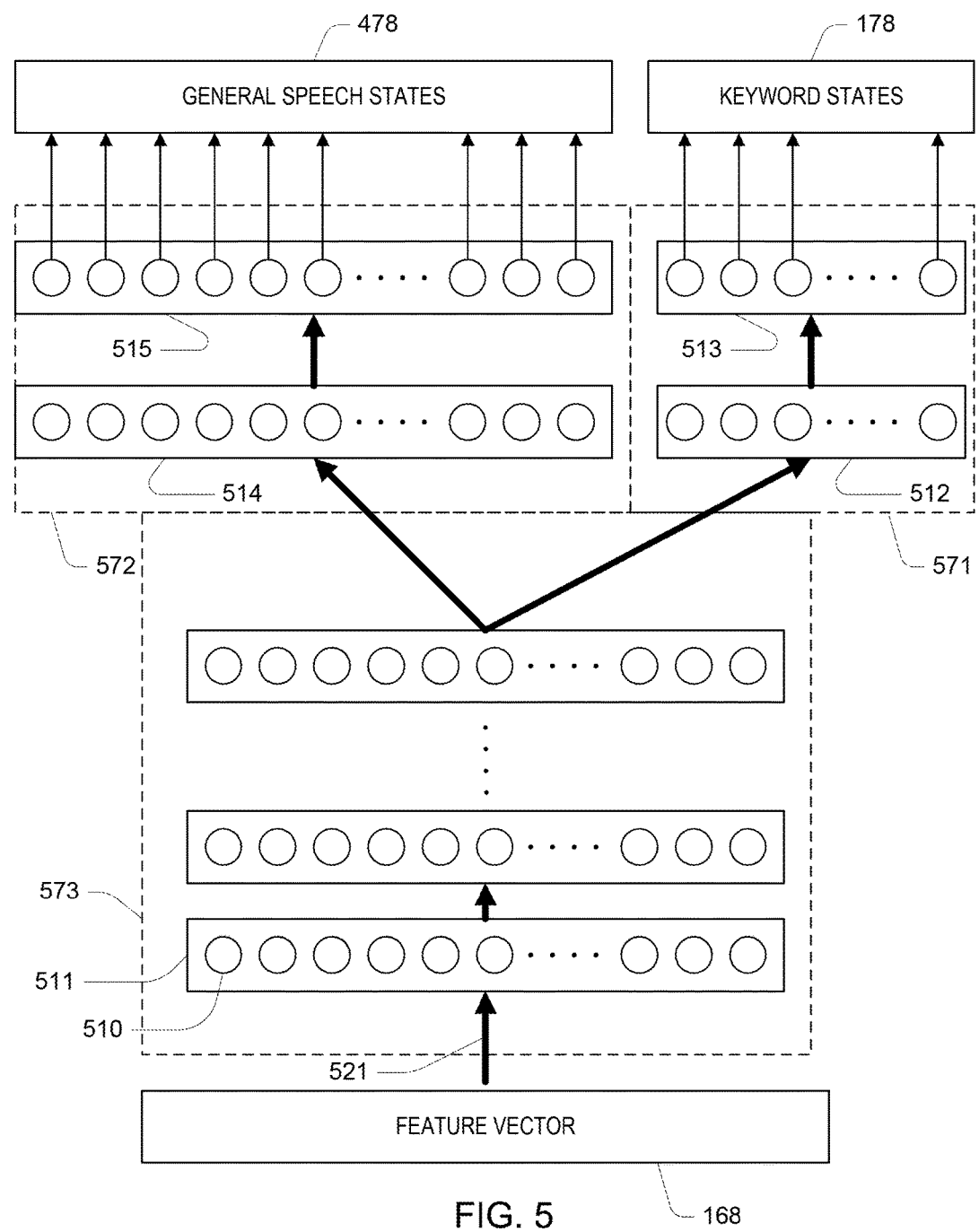
FIG. 5 is an illustration of a neural network implementation of an acoustic mapper configured according to acoustic parameters.

Referring to FIG. 5, the training configuration makes use of the same general structure as shown in FIG. 4. The acoustic parameter trainer 140 operates by accepting a set of feature training data 130 (see FIG. 1). In the discussion below, a total of N feature vectors are available to the trainer, denoted $x_n$ for the $n^{th}$ of those feature vectors. Each feature vector comes from one of the training utterances, either from the trigger utterances 121 or the general utterance 122.

As introduced above, and as shown in FIG. 2, the HMM for the keyword spotter has states associated with keyword states as well as other states for non-trigger words. There are a total of K=9 states in the illustrated example. Each distribution 178 that is output from the acoustic mapper therefore has K elements. For a particular feature vector $x_n$, the $k^{th}$ element of the output distribution is denoted $y_k^{(1)}(x_n)$, where the superscript "(1)" denotes one or multiple output distributions that could be computed by using the structure shown in FIG. 4, with the other output distribution, denoted "(2)" being associated with states of general speech.

The transcription data 125 represents or is processed in the training configuration to provide multiple labels corresponding to each training feature vector. For each feature vector $x_n$, a first label identifies the state $c_n$ of the keyword spotter HMM, such that $c_n$ is in the range 1, . . . , K. Therefore, for a feature vector $x_n$, the element of the output distribution corresponding to the label $c_n$ is $y_{c_n}^{(1)}(x_n)$.

The transcription data 125 also represents or is processed in the training configuration to provide for each training feature vector $x_n$ a second label $l_n$ associated with general speech. In this embodiment these labels identify the phones of the language, for instance as used in a large-vocabulary speech transcription system. Therefore, for a feature vector $x_n$, the element of the output distribution corresponding to the label $l_n$ is $y_{l_n}^{(2)}(x_n)$.

Very generally, the acoustic mapper trainer 140 uses the training data 120, 125 to determine a best set of acoustic parameters 192, which are collectively denoted W below. A measure of the quality of the parameters relative to the trigger-word detection task can be expressed in a cross-entropy form as $$\mathcal{L}^{(1)}(W) = \Sigma_{n=1}^{N} \mathcal{L}_n^{(1)}(W)$$

where $$\mathcal{L}_n^{(1)}(W) = -\log y_{c_n}^{(1)}(x_n)$$

and where the dependence of $y_{c_n}^{(1)}(x_n)$ on W is omitted to reduce the complexity of the notation.

Similarly, a measure of the quality of the parameters relative to the general speech recognition task can be expressed as $$\mathcal{L}^{(2)}(W) = \Sigma_{n=1}^{N} \mathcal{L}_n^{(2)}(W)$$

where $$\mathcal{L}_n^{(2)}(W) = -\log y_{l_n}^{(2)}(x_n)$$

The acoustic parameter trainer determines the best parameters W according to a combined measure of match uses a weighting of these two contributions as $$\mathcal{L}(W) = \gamma \mathcal{L}^{(1)}(W) + (1-\gamma) \mathcal{L}^{(2)}(W)$$

where the parameter $\gamma$ can be considered to represent an "importance" of the trigger word detection task related to the general speech recognition task. For training, the weighting parameter $0 < \gamma < 1$ is one of the training parameters 140 that is set to optimize performance, in a procedure that is described below.

In the HMM shown in FIG. 2 as used by the keyword spotter 180, as discussed above, certain states correspond to parts of the trigger word, and other states do not. In an utterance such as "silence—ah, Alexa, play music by the Beatles—silence", only the "Alexa" portion corresponds to one of the states (AX, L, . . . , S, or AX), while the remainder corresponds to the non-trigger word states (SP or NSP). As an optional feature, the training parameters 140 include a set of K weights $w_c$, for c=1, . . . , K. In general, the states c corresponding to the trigger word states have higher weights than the non-trigger word states. With this option, these weights are introduced as follows:

$$\mathcal{L}_n(W) = -w_{c_n} \log y_{c_n}^{(1)}(x_n)$$

and otherwise the expressions defining the overall measures of quality are unchanged.

Referring to FIG. 5, acoustic parameters 192 characterize an artificial neural network (ANN) in which there are multiple layers 511-515 of units 510 (only a single unit 510 is labeled in the Figure). Each of the units forms a nonlinear combination of the output of the previous layer. The feature vector 168 provides the inputs to the first layer 510 of the ANN, and the outputs of the last layers 513, 515 provide the values of the distribution for the keyword states 178 and the values of the distribution of the general speech states 478. The units and layers are partitioned onto a common part 573, a part 572 directly associated with the general speech states, and a part 571 directly associated with the keyword states. In FIG. 5, each part 571-573 is illustrated with multiple layers, however, it should be understood that each part may have one or more layers depending on the configuration of the system (which remains the same in the training and runtime operation of the system). Generally, there are more than a few layers in total in what is often referred to as a "Deep Neural Network" (DNN) approach. For example, the common part may have four layers, and each of the other two parts may have one layer each, for a total depth of five layers.

Each unit 510 of the system combines all the output values of the previous layer or in the case of the first layer, the elements of the input feature vector. Specifically, the unit makes a weighted additive combination of those previous outputs and passes that weighted combination through a non-linearity. For example, for the hidden layers the non-linearity is a logistic sigmoid or a hyperbolic tangent function. The output layers may implement Softmax functions, which yield distributions that sum to 1.0 and have non-negative entries such that the distributions have the characteristics of probability distributions.

As introduced above, the training aims to find a best set of weights for the units such to maximize $\mathcal{L}(W)$. A variety of optimization procedures may be used. For example, a stochastic gradient descent approach, as described in Nikko "Scalable Distributed DNN Training Using Commodity GPU Cloud Computing," *Proc. INTERSPEECH* 2015, pp. 1488-1492, Dresden, Germany. Generally, the procedure involves initialization of the weights of the units and then performing iterations of updates of the weights until a stopping condition is reached, for instance a number of iterations or in close to convergence of the weights.

Various approaches may be used for initialization of the unit weights. For example, the unit weights of the common part 572 and the general speech part 572 may first be fully estimated based on general speech training data. Then, trigger word part 571 may be initialized (e.g., at random), followed by combined training with all the training data. In another approach, such initial training on general speech is not used, and the entire neural network is trained in unified procedure.

As introduced above, the acoustic parameter trainer 140 may make use of training parameters 142, including the task weighting parameter $\gamma$ and the class weighting parameters $w_c$. One approach implemented by the training configuration is to select $\gamma$ based on repeated estimation of the parameters with different weight and selecting the weight that provides the best performance on held-out training data. For example a value of $\gamma=0.75$ is found in some experiments to provide the best performance. The class weights may be selected by making all the within-trigger-word states have a same higher value than the non-trigger-word states, and again selecting those values based on repeated retraining of the unit weights.

In the discussion above, in general, the keyword spotting task performed by the keyword spotter is one of detecting a trigger word or phrase, for instance, "Alexa" or "Alexa please." The network illustrated in FIG. 2 represents the sequence of states in the trigger word or phrase being detected. In an alternative embodiment, the keyword spotter is configured to detect a set of relatively short commands. In general, such commands include a trigger word prefix as well as one or more command words following the trigger word. Examples of such commands may include "Alexa stop," which may cause music that is playing to stop, or "Alexa lights off" or "Alexa lights on." In such an embodiment, the network of FIG. 2 is augmented with paths for the commands that are to be detected representing a finite state network of allowable word sequences. The keyword state output distribution 178 includes elements for the states of the network with the augmented paths. Therefore, when referring to a keyword spotting task performed by the keyword spotter, it should be understood that such a task can include detection of a trigger word or phrase, detection of a short command, or detection of a combination (e.g., concatenation) of a trigger word or phrase and a short command.

In a number of alternative runtime configurations, the general speech parameters 472, which are trained on general speech, are also used in the runtime configuration. One such alternative makes use of the distribution of general speech states 478 to improve the performance of the keyword spotting task. In another such alternative, a speech recognizer recognizes the words following a trigger word or phrase using the general speech parameters.

Figure 6:
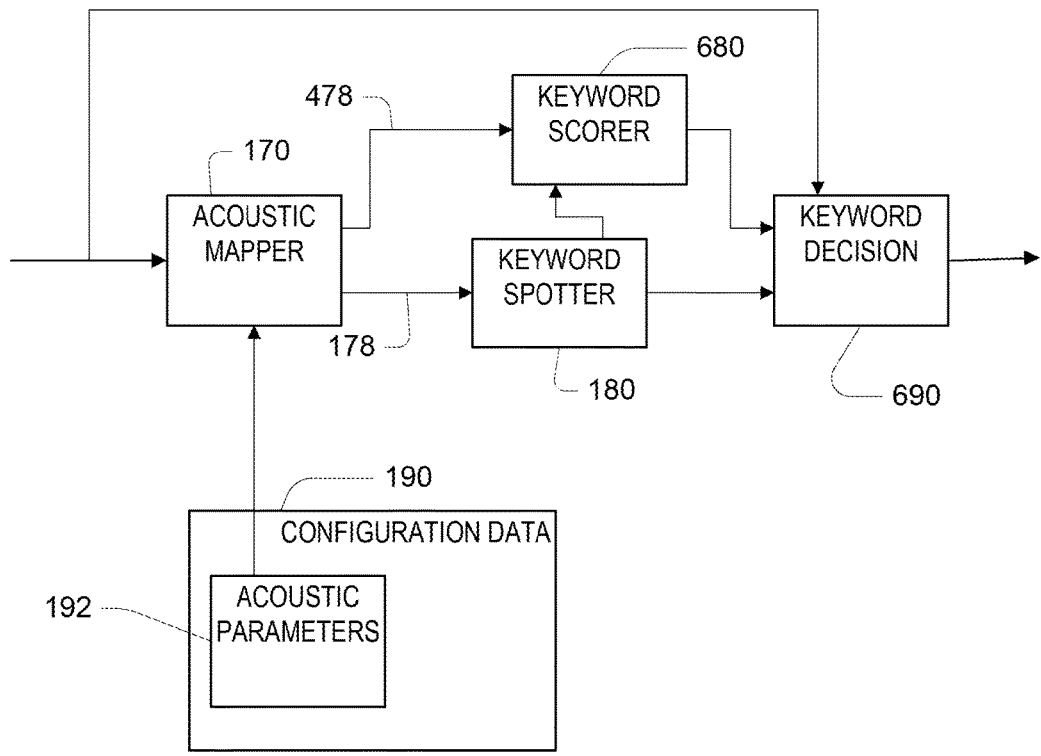
FIG. 6 is a block diagram of an alternative runtime configuration that makes use of general speech parameters in a keyword spotting task.

Referring to FIG. 6, the acoustic parameters 192 used in the runtime configuration include the general speech parameters 472, which are trained on general speech as described above. The acoustic mapper 170 is configured to provide both the distribution over keyword states 178 as well as the distribution over general speech states. In this embodiment, in operation, the keyword spotter 180 detects a keyword as described above. This detection is signaled to a keyword rescorer 680, which uses the general speech distributions 478 to determine a score for the same event. The keyword rescorer 680 and the keyword spotter 180 both provide information to a keyword decision block 690, which uses the information to make a decision of whether to declare that a true detection has occurred. There are a variety of alternative ways the approach illustrated in FIG. 6 can be implemented. One way is for the keyword rescorer and the keyword spotter each to provide a score to the keyword decision block. Another way is for the rescorer and the spotter to determine scores associated with each of the states of the keyword that was detected (e.g., as a numerical vector). The keyword decision block 690 then makes a combined decision, for example, implementing a Support Vector Machine (SVM) classifier that is configured according to training that was previously performed in a training phase. In some examples, the keyword decision block 690 further has access to the feature vectors that are also input to the acoustic mapper. In a variant of this approach, the keyword rescore 680 is replaced with a speech recognizer that independently processes the input and makes an independent decision of when it has recognized the trigger word, and then the keyword decision block combines the detection information from the keyword spotter and the recognizer.

Figure 7:
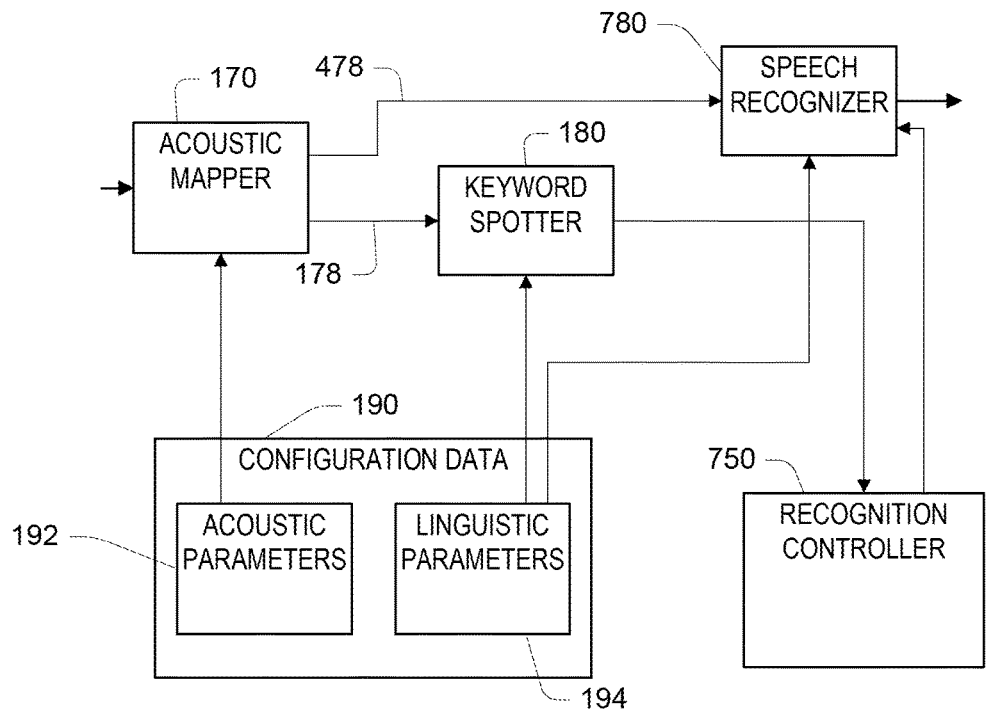
FIG. 7 is a block diagram of an alternative runtime configuration including a keyword spotter and a speech recognizer.

Referring to FIG. 7, in another alternative runtime configuration, the distribution 478 (see FIG. 4) of the general non-trigger word speech is used at runtime by a speech recognizer 780. For example, a recognition controller 750 may accept the output of the keyword spotter 180, and when the trigger word is detected, use a speech recognizer to further process the utterance based on the output of the acoustic mapper 170. One such processing may be recognition of the utterance that follows the trigger word. Another such processing may be a secondary scoring of the part of the utterance in which the trigger word was detected by the keyword spotter. In FIG. 7, the linguistic parameters 194 are shown as part of the configuration data. As introduced above, such linguistic parameters may represent the structure of the trigger word and corresponding HMM, as shown in FIG. 2, and may include data related to the lexicon used by the speech recognizer 780.

Although described in the context of a deep neural network implementation, alternative embodiments may use different structures. For example, the combined parameters 473 in FIG. 4 may represent parameters of shared Gaussian models, and general parameters 472 and the keyword specific parameters 471 may represent mixture weights for the Gaussians of the combined parameters. As another example, other forms of probabilistic graph-based models (e.g., factor graphs) may be used with a part of the graph being shared between the two training tasks (i.e., trigger word versus general speech), and other parts being specific to the two tasks.

The multi-task training approach described above uses a keyword spotting task, namely trigger word detection, and one other speech recognition task, namely a LVCSR task. More generally, the training may use a keyword spotting task and one or more other speech tasks (or other speech processing tasks, e.g., language or speaker recognition). Furthermore, the keyword spotting task is not necessarily limited to spotting of a single keyword and may involve training for multiple keywords of interest.

Figure 8:
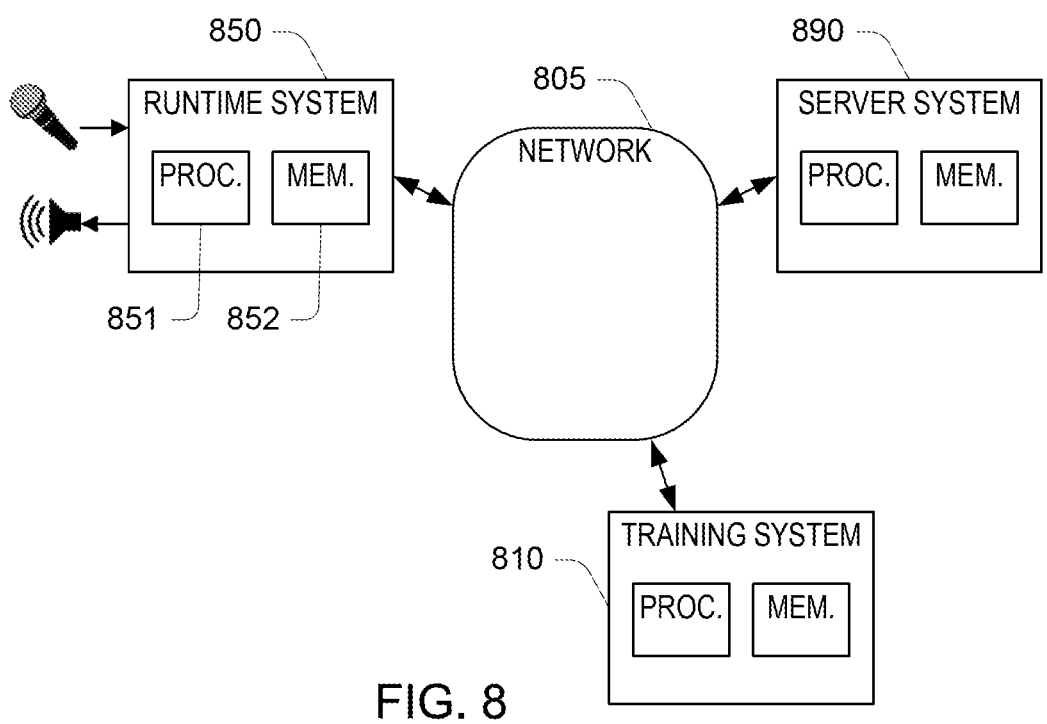
FIG. 8 is a diagram illustrating a system configuration of an ASR system.

Referring to FIG. 8, in some implementations, the runtime configuration 150 shown in FIG. 1 is hosted on a runtime system 850, which executes in a runtime stage. The runtime system may include a processor 851, for instance a general purpose processor or a digital signal processor (DSP), and a memory 852 (e.g., a non-transitory semiconductor memory readable by the processor). For example, the runtime system is an "appliance" that may be placed in the environment (e.g., on a shelf or table). The runtime procedures of the runtime configuration described above may be implemented in software that includes instructions for causing the processor 851 to perform the steps of the described procedures. The memory 852 also holds the configuration data for the runtime configuration. The runtime system is coupled to a network 805 (e.g., a local area network and/or the public Internet) to a training system 810, which hosts the training configuration 110 shown in FIG. 1 for execution in a training stage. This training system also includes a processor and memory for implementing the procedures of the training configuration, and in particular the procedures of the acoustic parameter trainer described above. The acoustic parameters are provided by the training system to the runtime system, for example, being passed via the network 805 and/or installed in the runtime system as part of a manufacturing or provisioning of the runtime system. In some implementations, there is also a server system 890, which interacts with the runtime system 850 at runtime. For example, the runtime system may implement the keyword spotter, and when the trigger word is detected, the acquired acoustic data is passed to the server system for speech transcription. As another example, speech transcription is performed in full or in part in the runtime system, and the server system performs further action (e.g., command interpretation) based on the result of the speech transcription at the runtime system. In some embodiments, some of the procedures are implemented in circuitry, for example, in an application specific integrated circuit (ASIC) or in a field programmable gate array (FPGA). Such circuitry may perform some computationally intensive aspects, for example, the processing of the acoustic mapper of the runtime configuration. In some embodiments, multiple processor cores and other related circuitry are integrated into a single integrated circuit that implements some or all of the functions of the runtime configuration. For example, one core may implement the audio front end and another core may implement the keyword spotter and application specific circuitry may implement the acoustic mapper.

Although the training configuration and the runtime configuration are described separately above, in some embodiments they are both hosted on a runtime system. For example, the training configuration may be used to update (adapt) the acoustic parameters locally in response to collecting utterances that contain the trigger word. Therefore, the configuration of systems shown in FIG. 8 is only an example, of how various functions may be divided between different systems. More generally, the various functions described above may be partitioned on computers and/or dedicated electronic devices differently than as described in specific examples above.

It is to be understood that the foregoing description is intended to illustrate and not to limit the scope of the invention, one or more aspects of which are defined by the scope of the appended claims. Other embodiments are within the scope of the following claims.

What is claimed is:

1. A method for automated detection of a trigger word in an automated speech recognition system, the method comprising:
   during a training stage,
      accepting acoustic training data and corresponding transcription training data, the acoustic training data including processed audio input for a first set of utterances for a trigger word detection task and processed audio input for a second set of utterances for a large vocabulary speech recognition task, and
      executing a computer-implemented acoustic parameter training procedure to determine acoustic configuration parameters that yield a best measure of quality of the acoustic configuration parameters on multiple tasks, the multiple tasks including the trigger word detection task and the large vocabulary speech recognition task, the acoustic configuration parameters comprise parameters of an artificial neural network comprising a plurality of layers, each layer comprising a plurality of units, and wherein a first part of the acoustic configuration parameters is associated with both the trigger word detection task and the large vocabulary speech recognition task and characterizes multiple layers of the artificial neural network, and a second part of the acoustic configuration parameters is associated with the trigger word detection task, and a third part of the acoustic configuration parameters is associated with the large vocabulary speech recognition task, and each of the second and third parts characterize at least one layer of the artificial neural network;
   after the training stage, storing the first part and the second part of the acoustic configuration parameters for configuration of the automated speech recognition system for use during a runtime stage in a user device associated with a user; and
   during the runtime stage, at the user device,
      processing a signal representing an acoustic input monitored at the user device in an environment, the acoustic input including an utterance of a trigger word by the user, the processing including processing successive sections of the signal to form successive numerical feature vectors representing the acoustic content of respective sections of the acoustic input,
      mapping each successive numerical feature vector to form a corresponding state distribution using the first part and the second part of the acoustic configuration parameters, without using the third part of the acoustic configuration parameters, the mapping including computing the state distribution using a numerical computation of the artificial neural network that includes the values of the first part and the second part of the acoustic configuration parameters, and
      using the state distributions as input to a keyword spotter to detect the utterance of the trigger word in the acoustic input;
   wherein the measure of quality of the acoustic configuration parameters includes a first contribution associated with trigger word detection task and a second contribution associated with the large vocabulary speech recognition task, and wherein the measure of quality comprises a weighted combination of the first and the second contribution according to a task weighting parameter.

2. The method of claim 1 further comprising, during a runtime stage:
   mapping each successive numerical feature vector to form a second state distribution using the third part of the acoustic configuration parameters; and
   using the second state distributions as input to a speech recognizer to recognize a sequence of words in acoustic input.

3. A method for automated speech recognition comprising storing acoustic configuration parameters for configuration of an automated speech recognition system for detection of a keyword in an acoustic input using the automatic speech recognition system configured with the acoustic configuration parameters, the acoustic parameters having been determined by a first process comprising:
   accepting acoustic training data and corresponding transcription training data, wherein the acoustic training data includes data for a first set of utterances associated with a keyword spotting task and data for a second set of utterances associated with a large vocabulary continuous speech recognition (LVCSR) task;
   executing an acoustic parameter training procedure to determine acoustic configuration parameters from both the first set of utterances and the second set of utterances according to a value of a combined measure of quality of the acoustic configuration parameters on multiple tasks including the keyword spotting task and the LVCSR task, the value of the combined measure of quality being determined from both the first set of utterances and the second set of utterances; and
   keyword spotting using the acoustic configuration parameters, the keyword spotting including processing, after the determining of the acoustic configuration parameters, data representing an acoustic input monitored in an environment to detect spoken occurrences of a keyword in the acoustic input;
   wherein the acoustic configuration parameters include a first part of the acoustic configuration parameters associated with both the keyword spotting task and the LVCSR task and that depends on both the first set of utterances and the second set of utterances, and a second part of the acoustic configuration parameters associated with the keyword spotting task; and
   wherein the combined measure of quality of the acoustic configuration parameters includes a first contribution associated with trigger word detection task and a second contribution associated with the large vocabulary speech recognition task, and wherein the measure of quality comprises a weighted combination of the first and the second contribution according to a task weighting parameter.

4. The method of claim 3 further comprising performing the first process to determine the acoustic configuration parameters.

5. The method of claim 3 further comprising performing the LVCSR task using the acoustic configuration parameters.

6. The method of claim 3 further comprising:
processing a succession of feature vectors using the acoustic configuration parameters, each feature vector representing acoustic content of a corresponding section of an acoustic input; and
providing the feature vectors to a keyword spotter configured with at least some of the acoustic configuration parameters to implement the keyword spotting task.

7. The method of claim 3 wherein the keyword spotting task comprises a trigger word or phrase detection task.

8. The method of claim 3 wherein the keyword spotting task comprises command detection task.

9. The method of claim 6 wherein the first set of utterances comprises utterances collected during a prior use of the keyword spotter, and the second set of utterances comprises read utterances.

10. The method of claim 3 wherein the acoustic configuration parameters further include a third part of the acoustic configuration parameters associated with the LVCSR task.

11. The method of claim 10 wherein storing the acoustic configuration parameters includes storing the first part of the acoustic configuration parameters and the second part of the acoustic configuration parameters and without storing the third part of the acoustic configuration parameters for configuring the system.

12. The method of claim 3 wherein the combined measure of quality of the acoustic configuration parameters comprises a weighted cross-entropy comprising a combination of measures including a first cross-entropy associated with the first set of utterances and a second cross-entropy associated with the second set of utterances.

13. The method of claim 12 wherein the combined measure of quality of the acoustic configuration parameters comprises a first contribution associated with keyword spotting task and a second contribution associated with the LVCSR task, and wherein the combined measure of quality comprises a weighted combination of the first and the second contribution according to a task weighting parameter characterizing an importance of each task.

14. The method of claim 3 wherein the determined acoustic configuration parameters comprise parameters of an artificial neural network that comprises a plurality of layers, and wherein the first part of the acoustic configuration parameters characterize a plurality of layers of the artificial neural network, and the second part and the third part of the acoustic configuration parameters characterize at least one layer of the artificial neural network.

15. The method of claim 14 wherein the artificial neural network comprises a deep neural network having at least three layers characterized by the first part of the acoustic configuration parameters.

16. The method of claim 3 wherein the combined measure of quality $\mathcal{L}(W)$ of the acoustic parameters, $W$, has a form of a weighted cross-entropy computable according to an expression $$\mathcal{L}(W) = \gamma \mathcal{L}^{(1)}(W) + (1-\gamma) \mathcal{L}^{(2)}(W)$$

where the first contribution associated with the trigger word detection task is computable according to $$\mathcal{L}^{(1)}(W) = \Sigma_{n=1}^{N} \mathcal{L}_n^{(1)}(W), \text{ where}$$

$$\mathcal{L}_n^{(1)}(W) = -w_{c_n} \log y_{c_n}^{(1)}(x_n)$$

and the second contribution associated with the large vocabulary speech recognition task is computable according to $$\mathcal{L}^{(2)}(W) = \Sigma_{n=1}^{N} \mathcal{L}_n^{(2)}(W), \text{ where}$$

$$\mathcal{L}_n^{(2)}(W) = -\log y_{l_n}^{(2)}(x_n),$$

and where N is the number of feature vectors, $x_n$ is the $n^{th}$ feature vector, $c_n$ is a state of the trigger word detection task associated with the $n^{th}$ feature vector, and $l_n$ is a state of the general speech recognition task associated with the $n^{th}$ feature vector, $\gamma$ represents a task weighting parameter, and $w_{c_n}$ represent the class weighting parameters.

17. A method for automated speech recognition comprising: storing acoustic configuration parameters in a storage, the acoustic configuration parameters including a first part of the acoustic configuration parameters associated with a keyword detection task and a LVCSR task, a second part of the acoustic configuration parameters associated with the keyword detection task, and a third part of the acoustic configuration parameters associated with the LVCSR task; processing successive sections of an acoustic input received at a device to form corresponding successive first numerical representations of the sections; processing the successive numerical representations using the acoustic configuration parameters to form successive first distributions and successive second distributions, each numerical representation being associated with a corresponding first distribution of the successive first distributions and with a corresponding second distribution of the successive second distributions, wherein processing a numerical representation of the successive numerical representations to form a first distribution of the successive first distributions uses the first part of the acoustic configuration parameters and the second part of the acoustic configuration parameters and not the third part of the acoustic configuration parameters, and wherein processing a numerical representation of the successive numerical representations to form a second distribution of the successive second distributions uses the first part of the acoustic configuration parameters and the third part of the acoustic configuration parameters and not the second part of the acoustic configuration parameters; and performing the keyword detection task using the successive first distributions as input, and performing the LVCSR task using the successive second distributions as input, wherein the acoustic configuration parameters comprise parameters of an artificial neural network comprising a plurality of layers, each layer comprising a plurality of units, and wherein the first part of the acoustic configuration parameters characterize multiple layers of the artificial neural network, and the second part and the third part of the acoustic configuration parameters characterize at least one layer of the artificial neural network.

18. The method of claim 17 wherein the keyword detection task and the LVCSR task each comprises a Hidden Markov Model (HMM) based speech processing task, wherein the first distributions and the second distributions characterize probability distributions over the states of HMMs.

19. The method of claim 17 wherein the keyword detection task comprises a trigger word detection task.

20. The method of claim 17 wherein the method further includes initiating the LVCSR task upon detection of a trigger word by the trigger word detection task.

21. The method of claim 17 wherein the LVCSR task comprises a rescoring task, and wherein the method further comprises combining output from the keyword detection task and an output of the rescoring task to detect occurrences of a trigger word in the acoustic input.

22. The method of claim 17 wherein the successive numerical representations comprise feature vectors representing frequency band energies of the acoustic input, and wherein the first distributions and the second distributions represent probability distributions over subword states.

23. Software stored on non-transitory machine-readable media having instructions stored thereupon, wherein instructions are executable by one or more processors to:
    accept acoustic training data and corresponding transcription training data, wherein the acoustic training data includes data for a first set of utterances associated with a keyword spotting task and data for a second set of utterances associated with a large vocabulary continuous speech recognition (LVCSR) task;
    execute an acoustic parameter training procedure to determine acoustic configuration parameters from both the first set of utterances and the second set of utterances according to a value of a combined measure of quality of the acoustic configuration parameters on multiple tasks including the keyword spotting task and the LVCSR task, the value of the combined measure of quality being determined from both the first set of utterances and the second set of utterance; and
    use the determined acoustic configuration parameters for automated speech recognition to detect a keyword in an acoustic input;
    wherein the acoustic configuration parameters include a first part of the acoustic configuration parameters associated with both the keyword spotting task and the LVCSR task and that depends on both the first set of utterances and the second set of utterances, and a second part of the acoustic configuration parameters associated with the keyword spotting task; and
    wherein the combined measure of quality of the acoustic configuration parameters includes a first contribution associated with trigger word detection task and a second contribution associated with the large vocabulary speech recognition task, and wherein the measure of quality comprises a weighted combination of the first and the second contribution according to a task weighting parameter.

24. A speech recognition system comprising:
    a storage for training data; and
    a computer-implemented trainer configured to
        accept acoustic training data and corresponding transcription training data, wherein the acoustic training data includes data for a first set of utterances associated with a keyword spotting task and data for a second set of utterances associated with a large vocabulary continuous speech recognition (LVCSR) task, and
        execute an acoustic parameter training procedure to determine acoustic configuration parameters from both the first set of utterances and the second set of utterances according to a value of a combined measure of quality of the acoustic configuration parameters on multiple tasks including the keyword spotting task and the LVCSR task, the value of the combined measure of quality being determined from both the first set of utterances and the second set of utterance; and
    a computer-implemented automated speech recognition system configured to
        use the determined acoustic configuration parameters to detect a keyword in an acoustic input;
    wherein the acoustic configuration parameters include a first part of the acoustic configuration parameters associated with both the keyword spotting task and the LVCSR task and that depends on both the first set of utterances and the second set of utterances, and a second part of the acoustic configuration parameters associated with the keyword spotting task; and
    wherein the combined measure of quality of the acoustic configuration parameters includes a first contribution associated with trigger word detection task and a second contribution associated with the large vocabulary speech recognition task, and wherein the measure of quality comprises a weighted combination of the first and the second contribution according to a task weighting parameter.

\* \* \* \* \*